350-173. SR
XR 3,925,813

United States Patent [19]

Toyama et al.

[11] 3,925,813

[45] Dec. 9, 1975

[54] OPTICAL SYSTEM FOR COLOR TELEVISION CAMERA

[75] Inventors: Seiji Toyama, Kawaguchi; Kazuo Yoshikawa, Omiya; Takeshi Higuchi, Tokyo, all of Japan

[73] Assignee: Fuji Photo Optical Co., Ltd., Omiya, Japan

[22] Filed: Feb. 5, 1974

[21] Appl. No.: 440,139

[30] Foreign Application Priority Data

July 2, 1973 Japan .......................... 48-73648

[52] U.S. Cl. .......................... 358/55; 358/43

[51] Int. Cl.[2] .......................... H04N 9/04

[58] Field of Search .......................... 358/41, 43, 44, 55

[56] References Cited

UNITED STATES PATENTS

| | | | |
|---|---|---|---|
| 3,515,460 | 6/1970 | Baluteau et al. | 358/55 |
| 3,681,521 | 8/1972 | Doi et al. | 358/55 |
| 3,696,202 | 10/1972 | Mori et al. | 358/43 |
| 3,735,030 | 5/1973 | Schneider | 358/55 |

*Primary Examiner*—Richard Murray
*Attorney, Agent, or Firm*—Fleit & Jacobson

[57] ABSTRACT

An objective lens system for a double tube color television camera is divided into an afocal zooming lens component and a pair of focussing lens components. Between the zooming lens component and the pair of focussing lens components is disposed a color separating prism which divides the light into first light of first color directed to one of the focussing lens components and second light of second color directed to the other of the focussing lens components. A light deviating prism is inserted in one focussing lens component so that the light passing through the deviating prism may be directed in the direction parallel to the light passing through the other focussing lens component, so that two image pickup tubes may be oriented in parallel to each other.

15 Claims, 1 Drawing Figure

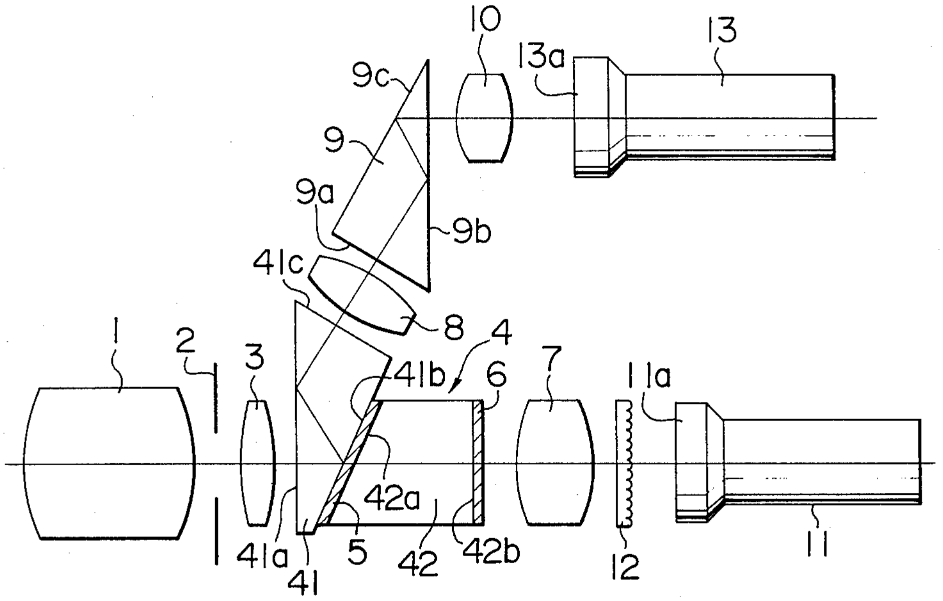
10
13a
13
9c
9
9a
9b
41c
8
4
1
2
3
41b
6
7
11a
42a
41a
5
42
42b
12
11
41

OPTICAL SYSTEM FOR COLOR TELEVISION CAMERA

This invention relates to an optical system for a double tube color television camera, and more particularly to an objective lens system including a color separating optical element for separation of the incident light into two colors to provide two signals for two image pickup tubes in a color television camera.

In the conventional double tube color television camera, the two image pickup tubes are provided in the camera not in parallel to each other because of the restriction on the construction of the optical system. Owing to the nonparallel orientation of the two image pickup tubes, the tubes are subjected to different degree of influence of the earth magnetism. By the different degree of the influence of the magnetic field created by the earth magnetism, the registration of the two images taken by the two image pickup tubes is affected, which results in reproduction of image of poor quality.

In view of the above-described defect inherent in the conventional color television camera, the principal object of the present invention is to provide an optical system for a double tube color television camera in which two image pickup tubes are arranged in parallel to each other for equalizing the influence of the earth magnetism on the two image pickup tubes.

Another object of the present invention is to provide an optical system for a double tube color television camera in which a color separating optical element is put in the objective lens system, between an afocal zooming lens component and two focussing optical components.

Still another object of the present invention is to provide an optical system for a double tube color television camera in which no relay lens is used to obtain high quality of image.

A further object of the present invention is to provide an optical system for a color television camera which enables the size of the whole camera to be designed compact.

A still further object of the present invention is to provide an optical system for a color television camera which makes the appearance of the camera neat and functional.

In order to accomplish the above objects of the invention, the optical system for a color television camera in accordance with the present invention comprises an afocal zooming lens component, a color separating optical means provided behind the afocal zooming lens component, and two focussing lens components provided behind and beside the color separating optical means respectively for receiving the light rays divided by the color separating optical means, said focussing lens component provided beside the color separating optical means including an optical path deviating element to direct the light coming from the color separating optical means in parallel to the light passing through the other focussing lens component behind the color separating optical means. By directing the optical paths of the light divided by said color separating optical means in parallel to each other, the image pickup tubes receiving the light involving different color image can be arranged in parallel, whereby the two image pickup tubes are subjected to the same influence of the earth magnetism. Therefore, the images taken by the different tubes are precisely registered with each other to reproduce a sharp color image.

Since the color separating optical means is provided in parallel rays and the optical path deviating element is provided in converging rays, the diameter of these optical elements can be made comparatively small and accordingly the whole size of the optical system can be made compact.

Above and other objects, features and advantages of the present invention will be made more apparent from the following detailed description of the preferred embodiment thereof taken in conjunction with the accompanying drawing in which a single FIGURE shows a longitudinal view of the optical system for a color television camera in accordance with the present invention illustrated together with image pickup tubes.

Referring to the drawing showing an embodiment of the present invention, a zooming lens component comprises an objective lens component 1 and a collimating lens component 3 located behind the objective lens component 1 in line therewith and an aperture stop 2 disposed between the objective lens 1 and the collimating lens component 3. The zooming lens component constitutes an afocal lens system and the light rays emanating therefrom become parallel. Behind the collimating lens component 3 is provided a color separating optical means or a prism 4 which divides a light beam incident thereto into two light beams of different color. The prism 4 comprises a first prism block 41 and a second prism block 42 attached to each other with a dichroic layer 5 interposed therebetween. The first prism block 41 has a first surface 41*a* extending in perpendicular to the optical path of the light from the zooming lens component 1 and 3, a second surface 41*b* extending behind the first surface 41*a* skewly with respect to the optical path of the light coming from the zooming lens component for reflecting a part of the light coming through the first surface 41*a* skewly backward toward the first surface 41*a*, and a third surface 41*c* extending in perpendicular to the optical path of the light coming from the first surface 41*a* after being reflected thereby.

The second prism block 42 is attached to the second surface 41*b* of the first prism block 41 with said dichroic layer 5 interposed therebetween. The second prism block 42 has a first surface 42*a* which is in contact with said dichroic layer 5 and a second surface 42*b* extending behind the first surface 42*a* in perpendicular to the optical path of the light coming from the first prism block 41 through said dichroic layer 5. The dichroic layer 5 reflects green light and transmits blue and red light. Therefore, only green light is reflected by the dichroic layer 5 and directed to the first surface 41*a* of the first prism block 41 and goes out of the prism block 41 through the third surface 41*c* thereof. Said second surface 42*b* of the second prism block 42 is provided with a filter layer 6 disposed thereon which passes only blue and red light and reflects or absorps green light. Behind the second surface 42*b* of the second prism block 42 is provided a focussing lens component 7 to focus an image including blue and red image information on the photoelectric conversion surface 11*a* of an image pickup tube 11 which takes blue and red color signals. The image pickup tube 11 for receiving the color signals includes a color stripe filter to take blue and red signals from the light of the image focussed on the photoelectric conversion surface 11*a* thereof. A spatial frequency limiting element 12 such as a lenticular plate or a quartz plate for eliminating fault signals or a noise may be disposed between the focussing lens component 7 and the image pickup tube 11.

Behind said third surface 41*c* of the first prism block 41 is provided a front component 8 of a focussing lens system for the green light. Behind the front component 8 of the focussing lens system is located a light deviating element such as a total reflection prism 9 which receives the light from the third surface 41*c* of the first prism block 41 coming through the front component 8 of the focussing lens system and directs the light in parallel to the light passing through said focussing lens component 7. The prism 9 has a first surface 9*a* extending in perpendicular to the optical path of the light from the front component 8, a second surface 9*b* extending skewly with respect to the optical path of the light for totally reflecting the light, and a third surface 9*c* extending skewly with respect to the optical path of the light reflected by the second surface 9*b* for reflecting the light toward an image pickup tube 13 through said second surface 9*b* in parallel to said light passing through said focussing lens component 7. A rear lens component 10 of the focussing lens system for the green light is provided behind the prism 9 to converge the light emanating from the prism 9 through the second surface 9*b* after reflected by said third surface 9*c*. The light image including the green light image information and a brightness signal is focussed on the photoelectric conversion surface 13*a* of an image pickup tube 13. Said front lens component 8 and said rear lens component 10 constitute a focussing lens system for focussing a green light image on the photoelectric conversion surface 13*a* of the second image pickup tube 13.

In operation of the optical system in accordance with the present invention as described hereinabove, the light coming through the afocal objective lens component 1 is collimated through the collimating lens component 3. The parallel rays emanating from the collimating lens 3 enter into the first prism block 41 of the color separating prism 4. The light including the green image information is reflected by the dichroic layer 5 applied on the second surface 41*b* of the first prism block 41 and directed toward the first surface 41*a* and reflected thereby and goes out of the first prism block 4 through the third surface 41*c* thereof. The light including the green image information goes through the focussing lens system 8 and 10 and is focussed on the photoelectric conversion surface 13*a* of the image pickup tube 13. By the light deviating prism 9 located between the lens components 8 and 10, the light is directed in parallel to the light passing through the focussing lens 7. The light passing through the dichroic layer 5 including the blue and red image information passes through the second prism block 42 and is focussed on the photoelectric conversion surface 11*a* of the image pickup tube 11 after passing through the color filter 6 which passes only the blue and red light.

Thus, color signals of blue and red image information are taken by the first image pickup tube 11 and the brightness signal and the green color signal are taken by the second image pickup tube 13. The image pickup tubes 11 and 13 are arranged in parallel with each other to receive the light from the focussing lens components 7 and 10.

Since the image pickup tubes 11 and 13 are arranged in parallel with each other, the both tubes are subjected to the same influence of the earth magnetism, and accordingly, the image signals taken by the both tubes 11 and 13 are precisely registered.

It will be understood that the brightness signal and the green light signal can be taken by the tube located behind the color separating prism 4 and blue and red color signals can be taken by the tube located beside the color separating prism 4 by using a dichroic layer which passes green light and reflects blue and red light.

What is claimed is:

1. An optical system for a double tube color television camera comprising an afocal objective lens component, a color separating optical means located behind said objective lens component for dividing the light incident thereto into first light carrying first color image information and second light carrying second color image information, a first focussing lens system located behind the color separating optical means for focussing said first light on a first image pickup tube of the camera, a second focussing lens system located beside the color separating optical means for focussing said second light on a second image pickup tube of the camera, and a light deviating means provided in said second focussing lens system for directing the second light in the direction parallel to the optical path of said first light.

2. An optical system for a double tube color television camera as defined in claim 1 wherein said light deviating means is an optical element having two reflecting surfaces arranged to reflect the second light from said color separating optical means toward the second image pickup tube.

3. An optical system for a double tube color television camera as defined in claim 2 wherein said light deviating means is a prism having a transmitting surface extending in perpendicular to the optical path of the second light coming from the color separating optical means, a first reflecting surface located behind the transmitting surface and extending skewly on the optical path of the second light passing through said transmitting surface, and a second reflecting surface extending skewly on the optical path of the second light reflected by said first reflecting surface to reflect the light in the direction parallel to the optical path of said first light.

4. An optical system for a double tube color television camera as defined in claim 3 wherein said prism is a triangular total reflection prism with an angle of 90° and a surface opposite to the angle of 90° is said first reflecting surface.

5. An optical system for a double tube color television camera as defined in claim 4 wherein one of the angles other than said angle of 90° is larger than 45° and the other is smaller than 45°, and the surface opposite to the latter angle is said second reflecting surface.

6. An optical system for a double tube color television camera as defined in claim 1 wherein said first color image information includes a color signal and said second color image information includes a brightness signal.

7. An optical system as defined in claim 6 wherein said color signal carries red and blue image information, and said second color image information also includes a color signal carrying green image information.

8. An optical system for a double tube color television camera as defined in claim 1 wherein said first color image information includes a brightness signal and said second color image information includes a color signal.

9. An optical system as defined in claim 8 wherein said color signal carries red and blue image information and said first color image information also includes a color signal carrying green image information.

10. An optical system as defined in claim 1 wherein said color separating optical means is a prism comprising a first transmitting surface extending perpendicular to the light incident thereto, a first reflecting surface located behind said first transmitting surface and extending skewly with respect to the light passing through said first transmitting surface, said first reflecting surface being provided with a dichroic layer extending in contact therewith to reflect a part of the light and transmit the remainder, a second reflecting surface extending skewly on the optical path of the light reflected by said first reflecting surface, and a second transmitting surface extending in perpendicular to the optical path of the light reflected by said second reflecting surface, and a third transmitting surface extending behind said first reflecting surface in parallel to said first transmitting surface to pass the light therethrough.

11. An optical system as defined in claim 10 wherein said third transmitting surface is provided with a color filter to pass only the light which is to pass through said dichroic layer.

12. An optical system as defined in claim 10 wherein said prism comprises a first prism block and a second prism block attached to each other with said dichroic layer interposed therebetween, said first prism block having said first transmitting surface, said first reflecting surface and said second transmitting surface, and said second prism block having said third transmitting surface and a transmitting surface which is in direct contact with said dichroic layer and extending in parallel to said first reflecting surface.

13. An optical system as defined in claim 1 wherein said color separating optical means is an optical element including a dichroic filter which reflects a part of the light including brightness information and transmits the remainder of the light including color information.

14. An optical system as defined in claim 1 wherein said color separating optical means is an optical element including a dichroic filter which reflects a part of the light including color information and transmits the remainder of the light including brightness information.

15. An optical system for a double tube color television camera, comprising an afocal objective lens component; focusing lens system located behind said afocal objective lens component comprising a first focusing lens system for focusing light on a first image pick-up tube of the camera, and a second focusing lens system for focusing light on a second image pick-up tube of the camera; a color separating optical means located behind said objective lens component, and in front of said focusing lens system for dividing the light incident thereto into first light carrying first color image information and second light carrying second color image information; and a light deviating means located in said second focusing lens system and behind said color separating optical means for directing said second light in the direction parallel to the optical path of said first light.

* * * * *